Sept. 13, 1949.                W. E. AMBERG                    2,481,640
                              SHAFT COUPLING
Filed March 11, 1948                                      2 Sheets-Sheet 1
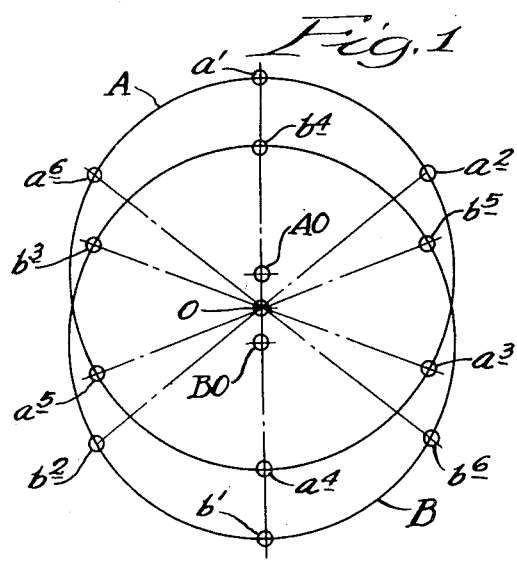
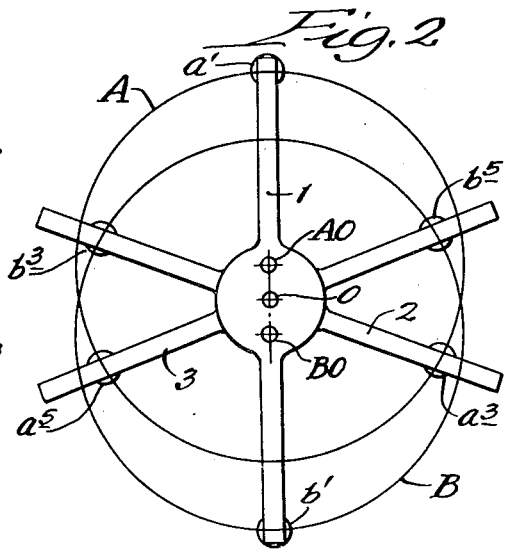
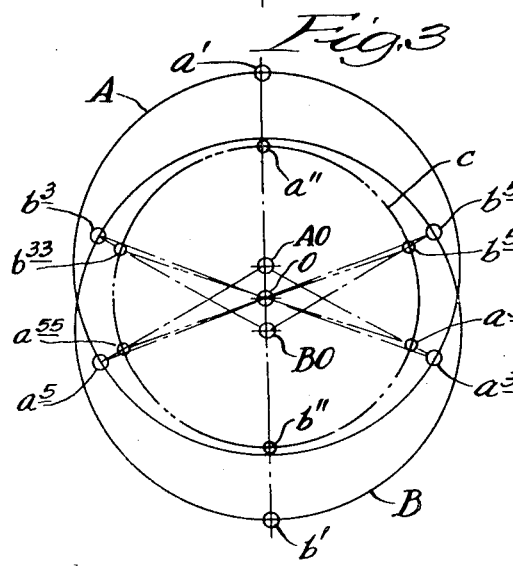
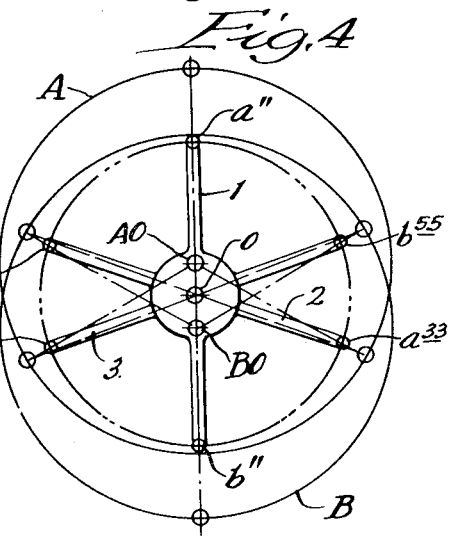
Inventor:
Walter E. Amberg,
By Dawson, Ooms, Booth and Spangenberg,
Attorneys.

Sept. 13, 1949. W. E. AMBERG 2,481,640
SHAFT COUPLING
Filed March 11, 1948 2 Sheets-Sheet 2
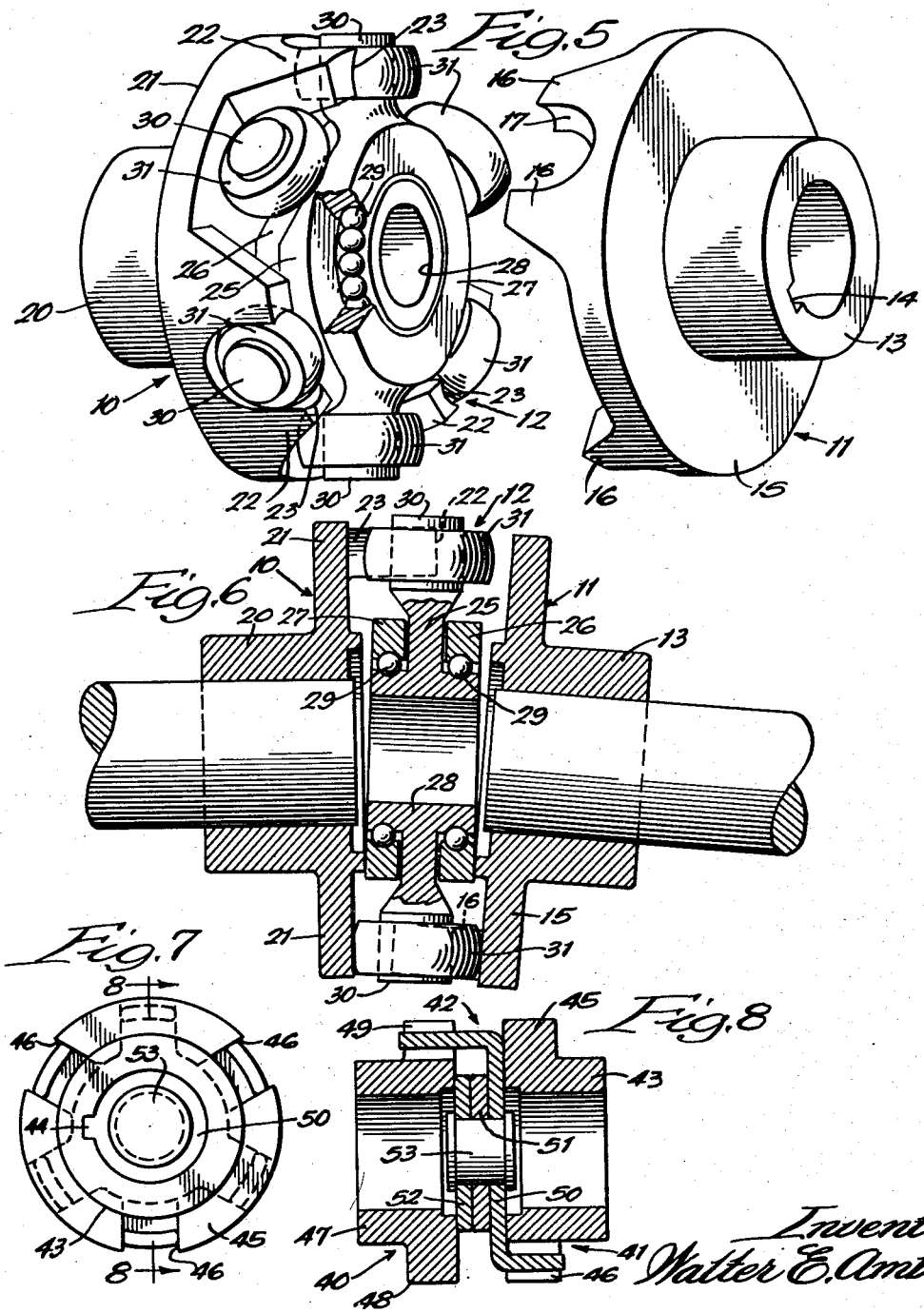
Inventor:
Walter E. Amberg,
By Dawson, Ooms, Booth and Spangenberg,
Attorneys.

Patented Sept. 13, 1949

2,481,640

UNITED STATES PATENT OFFICE 2,481,640

SHAFT COUPLING

Walter E. Amberg, Beverly Shores, Ind.

Application March 11, 1948, Serial No. 14,320

10 Claims. (Cl. 64—21)

This invention is directed to shaft couplings for misalined and for angularly disposed abutted shafts for transmitting rotation of one shaft to the other.

The principal object of this invention is to provide a constant velocity and balanced torque load carrying shaft coupling for misalined and for angularly disposed shafts wherein the velocity of rotation of one shaft is faithfully repeated by the other shaft, wherein eccentric motions and resultant vibration are eliminated.

Further objects of this invention reside in the details of construction of the improved shaft coupling and the cooperative relationship between the component parts thereof. In general, the improved shaft coupling includes a fitting adapted to be secured to each shaft and a planetary tripod interposed between the fittings including three diagonal levers pivoted together intermediate their ends with one end of each diagonal lever pivotally and radially and longitudinally movably connected to one of the fittings and with the other end of each diagonal lever pivotally and radially and longitudinally movably connected to the other fitting. The planetary tripod rotates about its own axis and transmits rotation from one shaft to the other with constant velocity and balanced torque and without vibration regardless of misalinement and angularity of the shafts.

Other objects and advantages will become apparent to those skilled in the art upon reference to the accompanying specification, claims and drawing in which:

Figure 1 is a diagrammatic analysis of one form of this invention;

Figure 2 is a diagrammatic illustration of the same form of the invention illustrating the manner in which the analysis of Fig. 1 may be mechanically carried out;

Figure 3 is a diagrammatic analysis of another form of the invention.

Figure 4 is a diagrammatic illustration of the other form of the invention illustrating the manner in which the diagrammatic analysis of Fig. 3 may be mechanically carried out;

Figure 5 is a perspective exploded view, of a commercial adaptation of the form of the invention illustrated in Figs. 1 and 2;

Figure 6 is a sectional view through the commercial form illustrated in Fig. 5;

Figure 7 is an end elevational view of a simplified commercial adaptation of the form of the invention illustrated in Figs. 3 and 4, and Figure 8 is a sectional view taken substantially along the line 8—8 of Fig. 7.

Referring now to the form of the invention analyzed and diagrammatically illustrated in Figs. 1 and 2, circles A and B represent misalinement of the shafts which are to be coupled together by the shaft coupling of this invention. The center lines of the misalined shafts are designated AO and BO. In the analysis of Fig. 1 points $a'$, $a^2$, $a^3$, $a^4$, $a^5$ and $a^6$ are equally spaced on the circumference of circle A and likewise points $b'$, $b^2$, $b^3$, $b^4$, $b^5$, and $b^6$ are equally spaced on the circumference of circle B. All diagonals drawn from points on one circle to opposing points on the other circle pass through a common center O, for example, the diagonals $a'$—$b'$, $a^2$—$b^2$, $a^3$—$b^3$, $a^4$—$b^4$, $a^5$—$b^5$ and $a^6$—$b^6$ all pass through the common center O. The common center O is equidistant from the centers AO and BO of circles A and B respectively and also is equidistant from the terminals of each diagonal, that is, center O is in the middles of diagonals $a'$—$b'$, $a^2$—$b^2$, $a^3$—$b^3$, $a^4$—$b^4$, $a^5$—$b^5$ and $a^6$—$b^6$.

Using the center O as a fixed fulcrum, AO as the center of one shaft, BO as the center of the other shaft and any diagonal such as diagonal $a^3$—$b^3$ as a lever adjoined to the shafts at its terminals $a^3$ and $b^3$, any force and motion is equally transmitted from one shaft to the other. This is true because the fixed fulcrum O is always in the center of the diagonal such as $a^3$—$b^3$.

In rotation every diagonal $a'$—$b'$ through $a^6$—$b^6$ are in constantly changing angular relation with one another compensating for changing leverage relationships coincidental with misalinement of the shafts, but in every instance the center O is always in the center of the various diagonals $a'$—$b'$ through $a^6$—$b^6$. Accordingly, each diagonal operates to transmit equally any force and motion from one shaft to the other. Three or more of such diagonals fulcrumed together at their centers fixes the position of the fulcrum O equidistant between the centers OA and BO of the shafts. Thus, the fulcrum O for the diagonals is fixed by the action of the diagonals themselves so that no separate support is needed for the fulcrum O although one may be provided, if desired.

Employing three of these diagonals in the form of a planetary tripod there may be provided a mechanical means for transmitting power with equalized torque and constant velocity from one shaft to another regardless of misalinement and such a mechanical means is diagrammatically illustrated in Fig. 2. The mechanical planetary tripod for accomplishing this result includes three diagonal levers 1, 2 and 3 which are pivotally joined together at the neutral center O and each diagonal lever is radially movably (slidably) and pivotally connected at diametrically opposed points on the driver and driven shaft members. The diagonal levers 1, 2, and 3 of Fig. 2, correspond to the diagonals $a'$—$b'$, $a^3$—$b^3$ and $a^5$—$b^5$ of Fig. 1 and the pivotal connection O between the diagonal levers 1, 2 and 3 corresponds to the fulcrum O of Fig. 1. The radially movable (slidable) and pivotal connections for the diagonal lever 1 are at $a'$—$b'$, for diagonal lever 2 at $a^3$ and $b^3$, and for diagonal lever 3 at $a^5$ and $b^5$ the slidable and pivotal connections $a'$, $a^3$ and $a^5$ being equally spaced on the circumference of the circle A and the slidable and pivotal connections $b'$, $b^3$ and $b^5$ being equally spaced on the circumference of the circle B. Circles A and B represent the driver and driven shaft members secured to the misalined shafts.

In the rotatable operation of the shaft coupling of Fig. 2, although the angular relationship between the diagonal levers 1, 2, and 3 is under continuous change, the relationship between the opposing angles formed by the diagonal levers remains constant, as for example, angle $a'Ob^5$ is always equal to angle $b'Oa^5$ likewise the distance between pairs of opposing slidable and pivotal connections always remain equal, for example, the distance $a'$ to $b^5$ always equals $b'$ to $a^5$, $b^5$ to $a^3$ always equals $a^5$ to $b^3$, and $a^3$ to $b'$ always equals $b^3$ to $a'$.

These conditions plus the condition that each diagonal lever of the planetary tripod, although under rotation is constantly changing its adjoinment length, that length always remains equally divided from its pivot point O, self-establishes the fulcrum or pivot point O in a fixed position mid-way between the center lines AO and BO of the misalined shafts. Accordingly, one shaft is driven by the other shaft regardless of misalinement and at a constant velocity and with balanced torque and at the same time the planetary tripod rotates about its own center whereby eccentric motion and consequent vibration are entirely lacking.

The form of the invention treated in Figs. 1 and 2 is based on a planetary tripod whose slidable and pivotal connection to the driver and driven shaft members are at fixed points on the circumference of the shaft members. In the form of the invention illustrated in Figs. 3 and 4, the shaft coupling is based on a planetary tripod of fixed diagonal lever lengths and whose radially movable (slidable) and pivotal connections to the driver and driven shafts are in radial tracks on the shaft members.

Referring now to Fig. 3 points $a'$, $a^3$ and $a^5$ are equally spaced on the circumference of circle A and points $b'$, $b^3$ and $b^5$ are equally spaced on the circumference of circle B. From these points to the centers of their respective circles radial lines are drawn which represent tracks for the radially movable (slidable) and pivotal connections between the planetary tripod and the shaft members. $a'$—AO, $a^3$—AO and $a^5$—AO are the tracks for shaft member A and $b'$—BO, $b^3$—BO and $b^5$—BO are the tracks for the shaft member B. The neutral point O or the fulcrum is established as in Fig. 1 at the intersection of the diagonals $a'$—$b'$, $a^3$—$b^3$ and $a^5$—$b^5$ at the neutral point or fulcrum O. Circle C is scribed and intersects with the radial tracks at points $a''$, $a^{33}$ and $a^{55}$ on one shaft member and at $b''$, $b^{33}$ and $b^{55}$ on the shaft member. These latter points establish the positions for the slidable and pivotal connections between the diagonal levers of the planetary tripod and the respective shaft members.

Referring now to Fig. 4 the diagonal levers 1, 2, and 3 pivoted together at the neutral point O form a planetary tripod wherein the diagonal levers are of fixed length. Each diagonal lever of fixed length is equally divided at the fulcrum or pivot O. The ends of the diagonal levers are pivotally and slidably (radially movably) connected in the radial tracks of the shaft members. All of the diagonal levers of the planetary tripod need not be of the same length as circumscribed by the circle C, but, however, each lever must be equally divided at fulcrum O.

In rotation, although the angular relationship between the diagonal levers 1, 2 and 3 is under continuous change, the relationship between the opposing angles remains constant, as for example, angle $a''Ob^{55}$ always equals $b''Oa^{55}$. By the same condition the distance between pairs of opposing pivotal and slidable connections remains equal, that is, the distance $a''$ to $b^{55}$ always equals the distance $b''$ to $a^{55}$, the distance $b^{55}$ to $a^{33}$ always equals the distance $a^{55}$ to $b^{33}$ and $a^{33}$ to $b''$ always equals the distance $b^{33}$ to $a''$. These conditions plus the condition that each diagonal lever of the planetary tripod always remains equally divided from its pivot point self-establishes the fulcrum or pivot point O in a fixed position at the neutral point O. Accordingly, the shaft coupling illustrated in Figs. 3 and 4 provides for constant velocity and equalized torque transmission in substantially the same manner as that of Figs. 1 and 2.

The analysis thus far has treated with misalinement of parallel shafts, providing for sliding (radially movable) and pivotal movement connections between the planetary tripod and the shaft members. In order to accommodate angularly disposed shafts as well as misalined shafts all that is necessary to do is to provide for longitudinal movement of the planetary tripod with respect to the shaft members and this may be accomplished by longitudinally slidably adjoining the ends of the diagonal levers of the planetary tripod with the shaft members. The planetary tripod automatically alines itself between the angularly disposed shafts so as to bisect the angle therebetween to provide constant velocity and balanced torque transmission.

A commercial adaptation of the form of the shaft coupling illustrated in Figs. 1 and 2 is shown in detail in Figs. 5 and 6. In this commercial adaptation one shaft member takes the form of a fitting generally designated at 10, and the other shaft member takes the form of a fitting generally designated at 11 and the planetary tripod is generally designated at 12. The fitting 11 includes a hub 13 provided with a key slot 14 by which the fitting may be secured to the end of one shaft. The hub 13 includes a flange 15 which is provided with three extensions 16 having longitudinal cylindrical grooves 17 therein.

The fitting 10 includes a hub 20 also provided with a key slot for receiving the end of the other shaft. The hub 20 is provided with a flange 21 which in turn is provided with three extensions 22 each having a longitudinal cylindrical groove 23. Thus the two fittings 10 and 11 are identical in construction and face each other with the extensions 18 of one fitting being staggered with respect to the extensions 22 of the other fitting.

The planetary tripod 12 includes three diagonal levers 25, 26 and 27. The diagonal lever 25 is provided with a hub 28 for pivotally mounting the diagonal levers 26 and 27, through anti-friction bearings 29. Each diagonal lever is provided with a pair of diametrically opposed trunnions 30 each supporting a roller 31 having a convex surface adapted to be received in the longitudinal cylindrical grooves in the extensions of the fittings. The convex surface of the rollers and the cylindrical grooves are in true ball fitting relationship. One roller of each diagonal lever is received in the longitudinal cylindrical grooves of the fitting 10 and the other roller is received in the longitudinal cylindrical grooves of the other fitting 11.

The shaft misalignment is compensated for by the pivotal movement of the rollers 31 in the longitudinal cylindrical grooves of the fittings and by slidable movement of the rollers on the trunnions 30 of the diagonal levers. Angularity of the shafts is compensated for by rotative movement and longitudinal sliding movement of the rollers in the longitudinal cylindrical grooves.

Figs. 7 and 8 disclose a simplified commercial adaptation of the form of the invention illustrated in Figs. 3 and 4. This commercial adaptation includes a fitting generally designated at 40 to be secured to one of the shafts and a fitting generally designated at 41 to be secured to the other shaft and the planetary tripod connecting the fittings is generally designated at 42.

The fitting 41 includes a hub 43 and a key slot 44 therein for mounting the fitting 41 on a shaft. The fitting, also, includes a flange 45 provided with three radial grooves 46.

The fitting 40 includes a hub 47 and a key slot for securing the fitting 40 to the shaft, and also, a flange 48 provided with three radial slots 49. The fittings 40 and 41 are, therefore, identical and in their use they face each other with the slots of one fitting being staggered with respect to the slots of the other fitting.

In the different forms of the invention described herein universal connections are used to connect one end of each diagonal lever to one shaft fitting only and to connect the other end of each diagonal lever to the other shaft fitting only. The particular universal connections, however, are specifically different in construction in the different forms of the invention although they accomplish substantially the same results. While the planetary tripod utilized in this invention has been illustrated as including three diagonal levers, which are the minimum number that can be employed, any greater number may be utilized.

The planetary tripod 42 includes three diagonal levers 50, 51, and 52 which are pivoted together by a pivot 53. Each of the diagonal levers are provided with longitudinal extensions adapted to be received in the slots 46 and 49 of the fittings. One end of each lever is received in the slots 46 of the fitting 41 and the other end of each lever is received in the slots 49 of the fitting 40.

Shaft misalinement is compensated for by the pivotal and radially slidable movements of the extensions of the diagonal levers in the slots 46 and 49 of the fittings and angularity of the shafts is compensated for by the rotatable and longitudinally slidable movement of the extensions of the diagonal levers in the slots 46 and 49.

While for purposes of illustration two forms of this invention have been disclosed, other forms thereof may become apparent to those skilled in the art upon reference to this disclosure and therefore this invention is to be limited only by the scope of the appended claims.

I claim as my invention:

1. A constant velocity and balanced torque shaft coupling for misalined shafts comprising, a first fitting to be secured to one shaft, a second fitting to be secured to the other shaft, at least three diagonal levers interposed between the fittings, a pivotal connection joining the diagonal levers intermediate the ends thereof to form a planetary tripod, and universal connections connecting one end of each diagonal lever and the first fitting only and connecting the other end of each diagonal lever and the second fitting only.

2. A constant velocity and balanced torque shaft coupling for misalined and angularly disposed shafts comprising, a first fitting to be secured to one shaft, a second fitting to be secured to the other shaft, at least three diagonal levers interposed between the fittings, a pivotal connection joining the diagonal levers intermediate the ends thereof to form a planetary tripod, and universal connections connecting one end of each diagonal lever and the first fitting only and connecting the other end of each diagonal lever and the second fitting only.

3. A constant velocity and balanced torque shaft coupling for misalined shafts comprising, a first fitting to be secured to one shaft, a second fitting to be secured to the other shaft, at least three diagonal levers interposed between the fittings, a pivotal connection joining the diagonal levers intermediate the ends thereof to form a planetary tripod, pivotal connections equally spaced circumferentially about the axis of each shaft connecting one end of each diagonal lever and the first fitting only and connecting the other end of each diagonal lever and the second fitting only, and said connections being movable along the axes of the diagonal levers.

4. A constant velocity and balanced torque shaft coupling for misalined and angularly disposed shafts comprising, a first fitting to be secured to one shaft, a second fitting to be secured to the other shaft, at least three diagonal levers interposed between the fittings, a pivotal connection joining the diagonal levers intermediate the ends thereof to form a planetary tripod, pivotal and longitudinally movable connections equally spaced circumferentially about the axis of each shaft connecting one end of each diagonal lever and the first fitting only and connecting the other end of each diagonal lever and the second fitting only, and said connections being movable along the axes of the diagonal levers.

5. A constant velocity and balanced torque shaft coupling for misalined shafts comprising, a first fitting to be secured to one shaft, a second fitting to be secured to the other shaft, at least three diagonal levers interposed between the fittings, a pivotal connection joining the diagonal levers intermediate the ends thereof to form a planetary tripod, pivotal connections equally spaced from the pivotal connection of the diagonal levers connecting one end of each diagonal lever and the first fitting only and connecting the other end of each diagonal lever and the second fitting only, and said connections being movable along equally spaced radii of the shafts.

6. A constant velocity and balanced torque shaft coupling for misalined and angularly disposed shafts comprising, a first fitting to be secured to one shaft, a second fitting to be secured to the other shaft, at least three diagonal levers interposed between the fittings, a pivotal connection joining the diagonal levers intermediate the ends thereof to form a planetary tripod, pivotal and longitudinally movable connections equally spaced from the pivotal connection of the diagonal levers connecting one end of each diagonal lever and the first fitting only and connecting the other end of each diagonal lever and the second fitting only, and said connections being movable along equally spaced radii of the shafts.

7. A constant velocity and balanced torque shaft coupling for misalined shafts comprising, a first fitting to be secured to one shaft and having three equally spaced radial tracks, a second fitting to be secured to the other shaft and having three equally spaced radial tracks, at least three diagonal levers interposed between the fittings with one end portion of each lever pivotally and slidably received in a radial track of the first fitting only and with the other end portion of each lever pivotally and slidably received in a radial track of the second fitting only, and a pivotal connection joining the diagonal levers intermediate the ends thereof to form a planetary tripod.

8. A constant velocity and balanced torque shaft coupling for misalined shafts comprising, a first fitting to be secured to one shaft and having at least three equally spaced circumferentially arranged pivots, a second fitting to be secured to the other shaft and having at least three equally spaced circumferentially arranged pivots, at least three diagonal levers interposed between the fittings with one end portion of each lever slidably received in a pivot of the first fitting only and with the other end portion of each lever slidably received in a pivot of the second fitting only, and a pivotal connection joining the diagonal levers intermediate the ends thereof to form a planetary tripod.

9. A constant velocity and balanced torque shaft coupling for misalined and angularly disposed shafts comprising, a first fitting to be secured to one shaft and having at least three equally spaced radial tracks, a second fitting to be secured to the other shaft and having at least three equally spaced radial tracks, at least three diagonal levers interposed between the fittings with one end portion of each lever pivotally and radially and longitudinally slidably received in a radial track of the first fitting only and with the other end portion of each lever pivotally and radially and longitudinally slidably received in a radial track of the second fitting only, and a pivotal connection joining the diagonal levers intermediate the ends thereof to form a planetary tripod.

10. A constant velocity and balanced torque shaft coupling for misalined and angularly disposed shafts comprising, a first fitting to be secured to one shaft and having at least three equally spaced and circumferentially arranged longitudinal cylindrical grooves, a second fitting to be secured to the other shaft and having at least three equally spaced and circumferentially arranged longitudinal cylindrical grooves, a roller having a convex surface pivotally and rotatably received in each cylindrical groove, at least three diagonal levers interposed between the fittings with one end portion of each lever slidably receiving a roller of the first fitting only and with the other end portion of each lever slidably receiving a roller of the second fitting only, and a pivotal connection joining the diagonal levers intermediate the ends thereof to form a planetary tripod.

WALTER E. AMBERG.

REFERENCES CITED

The following references are of record in the file of this patent:

UNITED STATES PATENTS

| Number | Name | Date |
|---|---|---|
| 1,625,410 | De Ram | Apr. 19, 1927 |
| 2,080,296 | Wood | May 11, 1937 |